United States Patent

Sano et al.

Patent Number: 5,248,640
Date of Patent: Sep. 28, 1993

[54] NON-REDUCIBLE DIELECTRIC CERAMIC COMPOSITION

[75] Inventors: Harunobu Sano, Kyoto; Yukio Hamaji, Nagaokakyo; Yukio Sakabe, Kyoto, all of Japan

[73] Assignee: Murata Manufacturing Co., Ltd., Japan

[21] Appl. No.: 951,206

[22] Filed: Sep. 25, 1992

[30] Foreign Application Priority Data

| Sep. 25, 1991 | [JP] | Japan | 3-274586 |
| Sep. 25, 1991 | [JP] | Japan | 3-274587 |
| Sep. 25, 1991 | [JP] | Japan | 3-274588 |
| Mar. 4, 1992 | [JP] | Japan | 4-083323 |

[51] Int. Cl.$^5$ .............................. C04B 35/46
[52] U.S. Cl. .............................. 501/137; 501/32; 501/79; 501/138; 501/139
[58] Field of Search ............ 501/137, 138, 139, 32, 501/79

[56] References Cited

U.S. PATENT DOCUMENTS

| 4,610,970 | 9/1986 | Wada et al. | 501/138 |
| 4,753,906 | 6/1988 | Nishigaki et al. | 501/139 |
| 4,781,859 | 11/1988 | Noi | 501/138 |
| 4,988,468 | 1/1991 | Nishioka et al. | 264/65 |

FOREIGN PATENT DOCUMENTS

| 0205137 | 12/1986 | European Pat. Off. |
| 57-042588 | 9/1982 | Japan . |
| 58-135507 | 8/1983 | Japan . |
| 58-223669 | 12/1983 | Japan . |
| 59-086103 | 5/1984 | Japan . |
| 60-20851 | 5/1985 | Japan . |
| 61-101459 | 5/1986 | Japan . |
| 0244061 | 2/1990 | Japan . |
| 3-045559 | 2/1991 | Japan . |
| 3-065557 | 3/1991 | Japan . |
| 3-285871 | 12/1991 | Japan . |

OTHER PUBLICATIONS

Chemical Abstracts; vol. 105, No. 24, Dec. 15, 1986, p. 269 Abstract No. 213 268s.

Primary Examiner—Mark L. Bell
Assistant Examiner—Deborah Jones
Attorney, Agent, or Firm—Ostrolenk, Faber, Gerb & Soffen

[57] ABSTRACT

A non-reducible dielectric ceramic composition comprises of a basic composition expressed by the general formula:

$$\{(Ba_{1-x-y}Sr_xCa_y)O\}_m(Ti_{1-o-p}Zr_oNb_p)O_{2+p/2}$$

an
wherein $0.05 \leq x\ 0.30$, $0.005 \leq y \leq 0.12$, $0 \leq o \leq 0.20$, $0.0005 \leq p \leq 0.012$, and $1.002 \leq m \leq 1.03$, or $$\{(Ba_{1-x-y-z}Sr_xCa_yMg_z)O\}_m(Ti_{1-o-p}Zr_oNb_p)O_{2+p/2}$$

wherein $0.05 \leq x \leq 0.35$, $0.005 \leq y\ 0.12$, $0.0005 \leq z \leq 0.05$, $0 < o \leq 0.20$, $0.0005 \leq p \leq 0.02$, $1.000 \leq m \leq 1.04$. The composition contains an additive (A) composed of one or more oxides selected from the group of $MnO_2$, $Fe_2O_3$, $Cr_2O_3$, CoO and NiO in an amount of 0.02 to 2.0 moles per 100 moles of the basic composition. The composition further contains an additive (B) consisting of $SiO_2$ and/or ZnO in an amount of 0.1 to 2.0 moles per 100 moles of the basic composition, or an additive (B) composed of a glass composition of a $BaO-SrO-Li_2O-SiO_2$ system in an amount of 0.05 to 5.0 parts by weight per 100 parts by weight of the basic composition.

4 Claims, No Drawings

NON-REDUCIBLE DIELECTRIC CERAMIC COMPOSITION

BACKGROUND OF THE INVENTION

Field of the Invention

The present invention relates to a non-reducible dielectric ceramic composition and, more particularly, a non-reducible dielectric ceramic composition used for monolithic ceramic capacitors.

Description of the Prior Art

In general, monolithic ceramic capacitors comprises plural dielectric ceramic layers united into a monolithic body, a plurality of internal electrodes formed between adjacent dielectric ceramic layers, and external electrodes formed on opposite sides of said monolithic body and connected to the alternate internal electrodes.

Such monolithic ceramic capacitor may be produced by preparing ceramic green sheets, forming a layer of metal paste for internal electrodes on one flat surface of each ceramic green sheet, stacking and pressing several green sheets with heat to form a multilayer green ceramic body, firing it to form a monolithic sintered ceramic body with internal electrodes, forming layers of metal paste for external electrodes on opposite sides of the monolithic sintered ceramic body, and baking them at a suitable temperature to form external electrodes.

As a dielectric material for monolithic ceramic capacitors, there have widely been used high permittivity dielectric ceramic compositions of a barium titanate system, especially, those comprising barium titanate and a small amount of a bismuth compound incorporated therein, such as bismuth titanate, bismuth stannate, bismuth zirconate, or the like.

The monolithic ceramic capacitors are generally manufactured by a method comprising the steps of preparing ceramic green sheets, forming an internal electrode layer with a conductive paste, stacking and uniting the printed green sheets, cutting the multilayered body into green chips, firing the green chips at a temperature of about 1250° to 1350° C. Since the internal electrodes are subjected to the sintering temperature of the dielectric ceramic material, a material for internal electrodes is required to have a melting point higher than the sintering temperature of the dielectric ceramics, high resistance to oxidation even in an oxidizing atmosphere, and does not react with the dielectric ceramics. Such requirements are fully met by noble metals such as platinum, gold, palladium and their alloys so that noble metals have been used widely as a material for internal electrodes of monolithic ceramic capacitors.

However, use of such noble metals results in increase of production cost of the monolithic ceramic capacitors. For example, the cost of internal electrodes occupies about 30 to 70% of the manufacturing cost of monolithic ceramic capacitors. Other metals with a high melting point includes base metals such as Ni, Fe, Co, W and Mo, but such base metals are oxidized easily in the oxidizing atmosphere at high temperature and loose the conductivity required for internal electrodes.

Thus, in order to use such a base metal as a material for internal electrodes, it is required to fire the dielectric ceramic material in a neutral or reducing atmosphere to prevent the base metal from oxidation. However, if the dielectric ceramic composition of the prior art is fired in such a reducing atmosphere, the composition is reduced considerably during firing and the semiconductorization takes place.

To solve such problems, it has been proposed in JP-B- S57-42588 to use a dielectric ceramic material comprising a solid solution of a barium titanate system and having a ratio of a barium site to a titanium site greater than the stoichiometric value, i.e., 1.00. Such a dielectric ceramic material is scarcely reduced to a semiconductor even if fired in a reducing atmosphere, thus making it possible to manufacture monolithic ceramic capacitors with internal electrodes of a base metal such as nickel.

On the other hand, the development of electronic techniques have led to considerable miniaturization of electronic devices. For this reason, there is an increasing demand for miniaturization of electronic parts including monolithic ceramic capacitors. It is generally known that the monolithic ceramic capacitors can be miniaturized by use of a dielectric ceramic material with a high dielectric constant or by decreasing a thickness of dielectric ceramic layers. However, dielectric ceramic materials with a high dielectric constant are large in grain size. Thus, if the thickness of dielectric ceramic layers is decreased to not more than 10 μm, the number of crystal grains present in each layer is considerably decreased, resulting in lowering of the reliability of monolithic ceramic capacitors.

JP-A- 61-101459 discloses a non-reducible dielectric ceramic composition with a small gain size comprising a solid solution of barium titanate and one or more rare earth elements (e.g., La, Nd, Sm, Dy) incorporated therein. The smaller the grain size, the greater is the number of crystal grains present in each dielectric layer. Thus, such a dielectric ceramic composition makes it possible to prevent the monolithic ceramic capacitors from lowering of the reliability.

It is, however, impossible with such a composition to obtain a high dielectric constant. In addition, this composition is apt to be reduced during sintering, thus making it difficult to produce monolithic ceramic capacitors with good characteristics.

SUMMARY OF THE INVENTION

It is therefore a main object of the present invention to provide a non-reducible dielectric ceramic composition which is large in dielectric constant but small in crystal grain size and which is never semiconductorized even if fired in a reducing atmosphere.

According to the present invention, there is provided a non-reducible dielectric ceramic composition consisting essentially of a basic composition of a modified barium titanate system and additives (A) and (B) incorporated therein, said basic composition consisting essentially of oxides of Ba, Sr, Ca, Ti, Zr and Nb and having a composition expressed by the general formula:

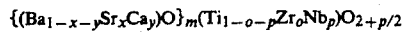

$$\{(Ba_{1-x-y}Sr_xCa_y)O\}_m(Ti_{1-o-p}Zr_oNb_p)O_{2+p/2}$$

wherein $0.05 \leq x \leq 0.30$, $0.005 \leq y \leq 0.12$, $0 < o \leq 0.20$, $0.0005 \leq p \leq 0.012$, and $1.002 \leq m \leq 1.03$, said additive (A) being composed of at least one oxide selected from the group consisting of oxides of Mn, Fe, Cr, Co and Ni, said additive (A) being incorporated into said basic composition in an amount of 0.02 to 2.0 moles per 100 moles of said basic composition in terms of respective oxides, $MnO_2$, $Fe_2O_3$, $Cr_2O_3$, CoO and NiO, said additive (B) consisting of $SiO_2$ and/or ZnO and incorporated into said basic composition in an amount of 0.1 to 2.0 moles per 100 moles of said basic composition.

In a preferred embodiment, the additive (B) is composed of a glass composition of a BaO-SrO-Li$_2$O-SiO$_2$ system instead of SiO$_2$ and/or ZnO which serves as a glass component.

Thus, according to the present invention, there is also provided a non-reducible dielectric ceramic composition consisting essentially of a basic composition of a modified barium titanate system and additives (A) and (B) incorporated therein, said basic composition consisting essentially of oxides of Ba, Sr, Ca, Ti, Zr and Nb and having a composition expressed by the general formula:

$$\{(Ba_{1-x-y}Sr_xCa_y)O\}_m(Ti_{1-o-p}Zr_oNb_p)O_{2+p/2}$$

wherein $0.05 \leq x \leq 0.35$, $0.005 \leq y \leq 0.12$, $0 < o \leq 0.20$, $0.0005 \leq p \leq 0.010$, and $1.002 \leq m \leq 1.04$, said additive (A) being composed of at least one oxide selected from the group consisting of oxides of Mn, Fe, Cr, Co and Ni, said additive (A) being incorporated into said basic composition in an amount of 0.02 to 2.0 moles per 100 moles of said basic composition in terms of respective oxides, MnO$_2$, Fe$_2$O$_3$, Cr$_2$O$_3$, CoO and NiO, said additive (B) being composed of a glass composition of a BaO-SrO-Li$_2$O-SiO$_2$ system and incorporated into said basic composition in an amount of 0.05 to 5.0 parts by weight per 100 parts by weight of said basic composition.

In another preferred embodiment of the present invention, a part of barium in the basic composition is replaced with the equimolar amount of magnesium to improve the insulating resistance at high temperatures.

Thus, according to the present invention, there is also provided a non-reducible dielectric ceramic composition consisting essentially of a basic composition of a modified barium titanate system and additives (A) and (B) incorporated therein, said basic composition consisting essentially of oxides of Ba, Sr, Ca, Mg, Ti, Zr and Nb and having a composition expressed by the general formula:

$$\{(Ba_{1-x-y-z}Sr_xCa_yMg_z)O\}_m(Ti_{1-o-p}Zr_oNb_p)O_{2+p/2}$$

wherein $0.05 \leq x \leq 0.30$, $0.005 \leq y \leq 0.10$, $0.0005 \leq z \leq 0.05$, $0 < o \leq 0.20$, $0.0005 \leq p \leq 0.02$, $1.000 \leq m \leq 1.04$, said additive (A) consisting of at least one oxide selected from the group consisting of oxides of Mn, Fe, Cr, Co and Ni, said additive (A) being incorporated into said basic composition in an amount of 0.02 to 2.0 moles per 100 moles of said basic composition in terms of respective oxides, MnO$_2$, Fe$_2$O$_3$, Cr$_2$O$_3$, CoO and NiO, said additive (B) being composed of SiO$_2$ and/or ZnO and incorporated into said basic composition in an amount of 0.1 to 2.0 moles per 100 moles of said basic composition.

According to the present invention there is further provided a non-reducible dielectric ceramic composition consisting essentially of a basic composition of a modified barium titanate system and additives (A) and (B) incorporated therein, said basic composition consisting essentially of oxides of Ba, Sr, Ca, Mg, Ti, Zr and Nb and having a composition expressed by the general formula:

$$\{(Ba_{1-x-y-z}Sr_xCa_yMg_z)O\}_m(Ti_{1-o-p}Zr_oNb_p)O_{2+p/2}$$

wherein $0.05 \leq x \leq 0.35$, $0.005 \leq y \leq 0.12$, $0.0005 \leq z \leq 0.05$, $0 < o \leq 0.20$, $0.0005 \leq p \leq 0.02$, $1.000 \leq m \leq 1.04$, said additive (A) composed of at least one oxide selected from the group consisting of oxides of Mn, Fe, Cr, Co and Ni, said additive (A) being incorporated into said basic composition in an amount of 0.02 to 2.0 moles per 100 moles of said basic composition in terms of respective oxides, MnO$_2$, Fe$_2$O$_3$, Cr$_2$O$_3$, CoO and NiO, said additive (B) consisting of a glass composition of a BaO-SrO-Li$_2$O-SiO$_2$ system and incorporated into said basic composition in an amount of 0.05 to 5.0 parts by weight per 100 parts by weight of said basic composition.

The non-reducible dielectric ceramic composition of the present invention can be fired in a reducing atmosphere at a temperature of not more than 1250° C. without causing reduction and semiconductorization thereof. This makes it possible to use base metals as a material for internal electrodes to cut down the manufacturing cost of monolithic ceramic capacitors.

The non-reducible dielectric ceramic composition of the present invention has a small grain size of not more than 3 μm though it possesses a high dielectric constant of not less than 11000. Thus, the non-reducible dielectric ceramic composition of the present invention makes it possible to manufacture monolithic ceramic capacitors with a large capacitance and high reliability as the dielectric ceramic layers can be made into thin layers without causing decrease in the number of crystal grains present therein.

The above and other objects, features and advantages of the present invention will become apparent from the following examples.

EXAMPLE 1

Using powders of BaCO$_3$, SrCO$_3$, CaCO$_3$, TiO$_2$, ZrO$_2$, Nb$_2$O$_5$, MnO$_2$, Fe$_2$O$_3$, Cr$_2$O$_3$, CoO, NiO, SiO$_2$ and ZnO with a purity of more than 99.8% as raw materials, there were prepared specimens for observation and measurement of electrical properties of non-reducible dielectric ceramic composition in the following manner: The raw materials BaCO$_3$, SrCO$_3$, CaCO$_3$, TiO$_2$, ZrO$_2$ and Nb$_2$O$_5$ were weighed and mixed to prepare a mixture for a basic composition expressed by the general formula:

$$\{(Ba_{1-x-y}Sr_xCa_y)O\}_m(Ti_{1-o-p}Zr_oNb_p)O_{2+p/2}$$

with values of x, y, o, p and m shown in Table 1.

Among the remaining raw materials, MnO$_2$, Fe$_2$O$_3$, Cr$_2$O$_3$, CoO, NiO, SiO$_2$ and ZnO, two or more raw materials were added, as additives (A) and (B), to the above mixture in amounts shown in Table per 100 moles of the basic composition. The resultant mixture of the raw materials was wet-milled for 16 hours with a ball mill, dried by evaporation and then calcined in air at 1100° C. for 2 hours. The clinker was crushed and ground to obtain calcined powder with a particle size of not more than 1 μm.

The calcined powder was added with suitable amounts of pure water and an organic binder of polyvinyl acetate, wet-milled for 16 hours with a ball mill, dried and then pressed at 2000 Kg/cm$^2$ to form ceramic green discs with a diameter of 10 mm and a thickness of 0.5 mm.

The green discs were placed in an electric furnace, heated to 500° C. in air to remove the organic binder by combustion, and then fired in a reducing 2atmosphere for 2 hours at a temperature shown in Table 2 to obtain sintered ceramic discs. The reducing atmosphere used was composed of a mixed gas of $N_2$, $H_2$ and $O_2$ with a partial pressure of oxygen ranging from $3\times10^{-8}$ to $3\times10^{-10}$ atm.

The resultant sintered ceramic discs were observed by a scanning-electron microscope at a magnification of 1500 to determine crystal gain size.

Each ceramic disc was provided on its opposite sides with silver electrodes by applying a silver paste and then baking it at 800° C. for 30 minutes in a nitrogen atmosphere to prepare a specimen for measurements of electrical properties.

For each specimen, measurements were made on dielectric constant ($\epsilon$), dielectric loss tangent (tan $\delta$), insulating resistance ($\rho$), and a temperature coefficient (TC) of capacitance.

The dielectric constant and dielectric loss were measured at 25° C., 1 Khz and 1 Vrms. The temperature coefficient of capacitance (C) was determined over the temperature range of $-25°$ C. to 85° C. relative to the capacitance at 20° C. Results are shown in Table 2.

In the tables, specimen with an asterisk are those having a composition out of the scope of the present invention.

TABLE 1

| No. | Basic composition $\{(Ba_{1-x-y}Sr_xCa_y)O\}_m(Ti_{1-o-p}Zr_oNb_p)O_{2+p/2}$ | | | | | Additive (A) (mole) | | | | | Additive (B) | |
|---|---|---|---|---|---|---|---|---|---|---|---|---|
| | x | y | m | o | p | $MnO_2$ | $Fe_2O_3$ | $Cr_2O_3$ | CoO | NiO | $SiO_2$ | ZnO |
| 1* | 0.03 | 0.09 | 1.01 | 0.12 | 0.0075 | 0.5 | — | — | — | — | 0.5 | 0.2 |
| 2* | 1.16 | 0.002 | 1.01 | 0.12 | 0.0075 | 0.5 | — | — | — | — | 0.5 | 0.2 |
| 3* | 0.25 | 0.06 | 1.01 | 0 | 0.0075 | 0.5 | — | — | — | — | 0.5 | 0.2 |
| 4* | 0.17 | 0.08 | 1.01 | 0.12 | 0 | 0.5 | — | — | — | — | 0.5 | 0.2 |
| 5* | 0.22 | 0.05 | 0.995 | 0.10 | 0.008 | 0.5 | — | — | — | — | 0.5 | 0.2 |
| 6* | 0.22 | 0.05 | 1.01 | 0.10 | 0.008 | — | — | — | — | — | 0.5 | 0.2 |
| 7* | 0.22 | 0.05 | 1.01 | 0.10 | 0.008 | 0.5 | — | — | — | — | — | — |
| 8 | 0.05 | 0.12 | 1.015 | 0.17 | 0.012 | 1.0 | 0.3 | 0.1 | 0.4 | 0.2 | 0.1 | — |
| 9 | 0.25 | 0.06 | 1.002 | 0.10 | 0.0075 | 0.5 | — | — | — | — | 0.3 | 0.2 |
| 10 | 0.22 | 0.05 | 1.02 | 0.12 | 0.0075 | 0.2 | 0.1 | — | — | 0.1 | 0.3 | 0.2 |
| 11 | 0.30 | 0.01 | 1.01 | 0.10 | 0.0005 | 0.02 | — | — | — | — | 0.7 | 0.5 |
| 12 | 0.22 | 0.005 | 1.03 | 0.12 | 0.0085 | 0.4 | — | — | 0.1 | — | 1.0 | 1.0 |
| 13 | 0.17 | 0.08 | 1.015 | 0.10 | 0.0075 | 0.4 | — | — | — | 0.1 | 1.0 | — |
| 14 | 0.25 | 0.10 | 1.01 | 0.01 | 0.0085 | 0.5 | — | 0.1 | — | — | 0.5 | 0.5 |
| 15 | 0.25 | 0.05 | 1.015 | 0.12 | 0.005 | 0.25 | — | — | — | — | 0.5 | 0.5 |
| 16 | 0.15 | 0.05 | 1.015 | 0.20 | 0.004 | 0.5 | — | — | — | — | 0.7 | 0.5 |
| 17* | 0.35 | 0.08 | 1.015 | 0.12 | 0.0075 | 0.5 | — | — | — | — | 0.5 | 0.2 |
| 18* | 0.17 | 0.15 | 1.01 | 0.12 | 0.0075 | 0.5 | — | — | — | — | 0.5 | 0.2 |
| 19* | 0.25 | 0.05 | 1.01 | 0.25 | 0.005 | 0.5 | — | — | — | — | 0.5 | 0.2 |
| 20* | 0.15 | 0.08 | 1.015 | 0.12 | 0.02 | 0.5 | — | — | — | — | 0.5 | 0.2 |
| 21* | 0.25 | 0.05 | 1.04 | 0.12 | 0.005 | 0.5 | — | — | — | — | 0.5 | 0.2 |
| 22* | 0.25 | 0.05 | 1.01 | 0.12 | 0.005 | 3.0 | — | — | — | — | 0.5 | 0.2 |
| 23* | 0.25 | 0.05 | 1.01 | 0.12 | 0.005 | 0.5 | — | — | — | — | 2.0 | 2.0 |

TABLE 2

| No. | Sintering temp. (°C.) | $\epsilon$ | tan $\delta$ | TC of capacitance $\Delta C/C_{20} \times 100/\Delta T$ (%) | | | Volume resistivity log $\rho$ ($\Omega \cdot$ cm) | | Grain size ($\mu$m) |
|---|---|---|---|---|---|---|---|---|---|
| | | | | $-25°$ C. | 85° C. | \|Max\| | 25° C. | 85° C. | |
| 1* | 1300 | 6900 | 2.5 | −45 | −9 | 120 | 13.0 | 12.7 | 2.0 |
| 2* | 1350 | 12200 | 3.4 | −70 | −34 | 70 | 11.3 | 8.5 | 3.0 |
| 3* | 1300 | 7200 | 1.7 | −68 | −12 | 175 | 12.9 | 12.6 | 2.5 |
| 4* | 1270 | 11200 | 0.7 | −72 | −74 | 74 | 13.1 | 12.9 | 7.0 |
| 5* | 1270 | | | unmeasurable | | | | | |
| 6* | 1300 | 12900 | 0.9 | −75 | −74 | 75 | 12.0 | 8.0 | 2.0 |
| 7* | 1350 | 15000 | 2.6 | −73 | −76 | 76 | 12.4 | 12.2 | 3.0 |
| 8 | 1250 | 12700 | 1.5 | −76 | −70 | 76 | 13.0 | 12.6 | 2.0 |
| 9 | 1270 | 15500 | 0.5 | −75 | −74 | 75 | 12.8 | 12.0 | 2.0 |
| 10 | 1270 | 15900 | 0.8 | −77 | −71 | 77 | 13.2 | 13.0 | 1.0 |
| 11 | 1300 | 12600 | 0.4 | −73 | −74 | 74 | 13.1 | 13.0 | 1.5 |
| 12 | 1270 | 17100 | 0.8 | −76 | −77 | 77 | 12.9 | 12.2 | 3.0 |
| 13 | 1250 | 15000 | 0.6 | −75 | −73 | 75 | 13.3 | 13.0 | 2.0 |
| 14 | 1250 | 17500 | 0.8 | −77 | −78 | 78 | 13.1 | 12.7 | 3.0 |
| 15 | 1230 | 16300 | 0.7 | −74 | −76 | 76 | 13.2 | 13.0 | 2.0 |
| 16 | 1270 | 12300 | 0.8 | −72 | −70 | 72 | 13.1 | 13.0 | 2.5 |
| 17* | 1350 | 8600 | 0.4 | −65 | −81 | 81 | 13.0 | 12.7 | 3.0 |
| 18* | 1350 | 5300 | 0.3 | −55 | −72 | 72 | 13.2 | 12.3 | 2.0 |
| 19* | 1350 | 4400 | 1.5 | −33 | −44 | 44 | 13.0 | 12.7 | 3.0 |
| 20* | 1250 | | | unmeasurable | | | | | |
| 21* | | | | not sintered | | | | | |
| 22* | 1250 | 14800 | 2.7 | −73 | −76 | 76 | 11.6 | 8.7 | 3.0 |
| 23* | 1250 | 10000 | 1.5 | −73 | −74 | 74 | 11.3 | 8.1 | 6.5 |

As can be seen from the results shown in Table 1, the non-reducible dielectric ceramic composition of the present invention possesses a high dielectric constant of not less than 12000 and a low dielectric loss tangent of not more than 2.0%, and meets requirements of class F defined by JIS as a temperature coefficient of capacitance is in the range of −80% to +30% over the temperatures range of −25° C. to +85° C.

The composition of the present invention has a high insulating resistance as the logalithimic value of volume resistance is not less than 12. Also, it can be sintered at a relatively low temperature of not more than 1300° C., and has a small grain size of not more than 3 μm.

The non-reducible dielectric ceramic composition of the system $\{(Ba_{1-x-y-z}Sr_xCa_yMg_z)O\}_m(Ti_{1-o-p-}Zr_oNb_p)O_{2+p/2}$ has been limited to those having values of x, y, m, o and p within the above respective ranges for the following reasons:

If the molar fraction of strontium, x, is less than 0.05 like as specimen No. good results are never obtained since the dielectric constant becomes less than 12000, since the dielectric loss tangent exceeds 2.0%, and since the temperature coefficient of capacitance becomes large. If the molar fraction of Sr, x, exceeds 0.30 like as specimen No. 17, the sintering properties of the ceramics becomes lowered and the dielectric constant becomes less than 12000. In addition, the temperature coefficient of capacitance becomes too large to meet the standard of class F defined in JIS. For these reasons, the molar fraction of strontium has been limited to a value of not less than 0.05 but not more than 0.30.

If the molar fraction of calcium, y, is less than 0.005 like as specimen No. 2, the sintering properties become worse, the dielectric loss tangent becomes more than 2.0%, and the insulating resistance becomes lowered. If the molar fraction of calcium, y, exceeds 0.12, like as specimen No. 18, the sintering properties become worse and the dielectric constant becomes lowered. For these reasons, the molar fraction of calcium has been limited to a value of not less than 0.005 but not more than 0.12.

If the molar fraction of zirconium, o, is 0, like as specimen No. 3, the dielectric constant becomes less than 12000 and the temperature coefficient of capacitance becomes large. On the other hand, if o exceeds 0.20, like as specimen No. 19, the sintering properties become lowered and the dielectric constant is lowered to less than 12000. For these reasons, the molar fraction of zirconium has been limited to a value of more than 0 but not more than 0.20.

If the molar fraction of niobium, p, is less than 0.0005, like as specimen No. 4, the dielectric constant becomes less than 12000 and the crystal grain size exceeds 3 μm. On the other hand, if p exceeds 0.012, like as specimen No. 20, the ceramic composition is reduced to a semiconductor when fired in a reducing atmosphere, resulting in considerable lowering of the insulating resistance. Thus, the molar fraction of niobium niobinium has been limited to a value of not less than 0.0005 but not more than 0.012.

If the molar ratio of $(Ba_{1-x-y-z}Sr_xCa_yMg_z)O$ to $(Ti_{1-o-p}Zr_oNb_p)O_{2+p/2}$, i.e., m, is less than 1.002, like as specimen No. 5, the ceramic composition is reduced to a semiconductor when fired in a reducing atmosphere. In contrast therewith, if m exceeds 1.03, the sintering properties becomes considerably lowered. Thus, the molar ratio of the barium site to titanium site has been limited to a value of not less than 1.002 but not more than 1.03.

Further, if the added amount of the at least one additive selected from the group consisting of oxides of Mn, Fe, Cr, Co and Ni is less than 0.02 mole in terms of respective oxides, $MnO_2$, $Fe_2O_3$, $Cr_2O_3$, CoO and NiO per 100 mole of said basic composition, like as specimen No. 6, the insulating resistance at a temperature of more than 85° C. becomes lowered, resulting in lowering of the reliability in a long use at a high temperature. If the added amount of additive (A) exceeds 2.0 moles per 100 mole of the basic composition like as specimen No. 21, the dielectric loss tangent exceeds 2.0% and the insulating resistance becomes lowered.

If the added amount of additive (B) is less than 0.1 mole per 100 moles of the basic composition like as specimen No. 7, the sintering property becomes lowered and the dielectric loss tangent exceeds 2.0%. If the added amount of additive (B) exceeds 2.0 moles per 100 moles of the basic composition like as specimen No. 22, the dielectric constant is decreased to less than 12000 and the crystal grain size becomes more than 3 μm. Thus, the added amount of additive (B) has been limited to those ranging from 0.1 to 2.0 moles per 100 moles of the basic composition.

EXAMPLE 2

Using powders of $BaCO_3$, $SrCO_3$, $CaCO_3$, $TiO_2$, $ZrO_2$, $Nb_2O_5$, $MnO_2$, $Fe_2O_3$, $Cr_2O_3$, CoO and NiO with a purity of more than 99.8% as raw materials, there were prepared specimens for electron-microscope observation and measurement of electrical properties of non-reducible dielectric ceramic composition in the following manner: The raw materials $BaCO_3$, $SrCO_3$, $CaCO_3$, $TiO_2$, $ZrO_2$ and $Nb_2O_5$ were weighed and mixed to prepare a mixture for a basic composition expressed by the general formula:

$$\{(Ba_{1-x-y}Sr_xCa_y)O\}_m(Ti_{1-o-p}Zr_oNb_p)O_{2+p/2}$$

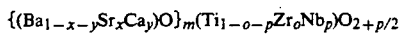

with values of x, y, o, p and m shown in Table 3. One or more of the remaining raw materials, $MnO_2$, $Fe_2O_3$, $Cr_2O_3$, CoO and NiO were added as additive (A) to the resultant mixture in the ratios shown in Table 3 per 100 moles of the basic composition. The resultant mixture of raw materials was milled by the wet process for 16 hours with a ball mill, dried by evaporation and calcined in air at 1100° C. for 2 hours. The clinker was crushed and then ground to obtain calcined powder with a particle size of not more than 1 μm.

Separate from the above, there was prepared an additive (B) in the following manner: The raw materials, $BaCO_3$, $SrCO_3$, $Li_2CO_3$, $SiO_2$, $CaCO_3$, MgO and $B_2O_3$ were weighed and mixed to prepare a glass composition of a $BaO-SrO-Li_2O-SiO_2$ system consisting of, by weight, 10% of BaO, 5% of SrO, 5% of $Li_2O$, 30% of $SiO_2$, 10% of CaO, 5% of MgO and 35% of $B_2O_3$. The mixture of raw materials were milled by the wet process with a ball mill for 16 hours. The mixture was, after dried by evaporation, put into an aluminum crucible, maintained at 1300° C. for hour, vitrified by rapid cooling, and then ground to pass a 200 mesh sieve.

The resultant powdered glass composition was added to the above calcined powder together with a suitable amount of pure water and polyvinyl acetate binder. The mixture was wet-milled with a ball mill for 16 hours, dried and then pressed at 2000 Kg/cm² to form green ceramic discs with a diameter of 10 mm and a thickness of 0.5 mm.

The green discs were treated in the same manner as Example to prepare specimens for electron-microscope observation and measurement of electrical properties. The electrical properties, dielectric constant (ε), dielectric loss tangent (tan δ), insulating resistance (ρ), and a temperature coefficient (TC) of capacitance were measured in the same manner as Example 1. Results are shown in Table 4.

TABLE 3

| No. | Basic composition $\{(Ba_{1-x-y}Sr_xCa_y)O\}_m(Ti_{1-o-p}Zr_oNb_p)O_{2+p/2}$ | | | | | Additive (A) (mole) | | | | | Additive (B) glass (parts by weight) |
|---|---|---|---|---|---|---|---|---|---|---|---|
| | x | y | m | o | p | $MnO_2$ | $Fe_2O_3$ | $Cr_2O_3$ | CoO | NiO | |
| 24* | 0.03 | 0.09 | 1.01 | 0.12 | 0.0075 | 0.5 | — | — | — | — | 0.3 |
| 25* | 0.16 | 0.002 | 1.01 | 0.12 | 0.0075 | 0.5 | — | — | — | — | 0.3 |
| 26* | 0.25 | 0.06 | 1.01 | 0 | 0.0075 | 0.5 | — | — | — | — | 0.3 |
| 27* | 0.17 | 0.08 | 1.01 | 0.12 | 0 | 0.5 | — | — | — | — | 0.3 |
| 28* | 0.22 | 0.05 | 0.995 | 0.10 | 0.008 | 0.5 | — | — | — | — | 0.3 |
| 29* | 0.22 | 0.05 | 1.01 | 0.10 | 0.008 | — | — | — | — | — | 0.3 |
| 30* | 0.22 | 0.05 | 1.01 | 0.10 | 0.008 | 0.5 | — | — | — | — | — |
| 31 | 0.05 | 0.12 | 1.015 | 0.17 | 0.01 | 1.0 | 0.2 | — | 0.4 | 0.4 | 0.05 |
| 32 | 0.25 | 0.06 | 1.002 | 0.10 | 0.0075 | 0.5 | — | — | — | — | 1.0 |
| 33 | 0.22 | 0.05 | 1.02 | 0.12 | 0.0075 | 0.2 | — | — | — | 0.1 | 0.5 |
| 34 | 0.35 | 0.01 | 1.01 | 0.10 | 0.0005 | 0.02 | — | — | — | — | 1.0 |
| 35 | 0.22 | 0.005 | 1.04 | 0.12 | 0.0085 | 0.2 | — | — | 0.1 | 0.1 | 5.0 |
| 36 | 0.17 | 0.08 | 1.015 | 0.10 | 0.0075 | 0.4 | — | 0.1 | — | — | 0.3 |
| 37 | 0.25 | 0.10 | 1.01 | 0.01 | 0.0085 | 0.2 | — | — | — | 0.1 | 0.7 |
| 38 | 0.25 | 0.05 | 1.015 | 0.12 | 0.005 | 0.25 | — | — | — | — | 0.5 |
| 39 | 0.15 | 0.05 | 1.015 | 0.20 | 0.004 | 0.5 | — | — | — | — | 0.5 |
| 40* | 0.40 | 0.05 | 1.015 | 0.12 | 0.0075 | 0.5 | — | — | — | — | 0.3 |
| 41* | 0.17 | 0.15 | 1.01 | 0.12 | 0.0075 | 0.5 | — | — | — | — | 0.3 |
| 42* | 0.25 | 0.05 | 1.01 | 0.25 | 0.005 | 0.5 | — | — | — | — | 0.3 |
| 43* | 0.15 | 0.08 | 1.015 | 0.12 | 0.02 | 0.5 | — | — | — | — | 0.3 |
| 44* | 0.25 | 0.05 | 1.05 | 0.12 | 0.005 | 0.5 | — | — | — | — | 1.0 |
| 45* | 0.25 | 0.05 | 1.01 | 0.12 | 0.005 | 3.0 | — | — | — | — | 0.5 |
| 46* | 0.25 | 0.05 | 1.01 | 0.12 | 0.005 | 0.5 | — | — | — | — | 10.0 |

TABLE 4

| No. | Sintering temp. (°C.) | ε | tan δ | TC of capacitance $\Delta C/C_{20} \times 100/\Delta T$ (%) | | | Volume resistivity log ρ (Ω·cm) | | Grain size (μm) |
|---|---|---|---|---|---|---|---|---|---|
| | | | | −25° C. | 85° C. | \|Max\| | 25° C. | 85° C. | |
| 24* | 1250 | 6500 | 2.6 | −44 | −5 | 100 | 13.0 | 12.6 | 2.0 |
| 25* | 1300 | 11700 | 3.3 | −72 | −33 | 75 | 11.4 | 8.6 | 3.0 |
| 26* | 1250 | 7700 | 1.5 | −70 | −13 | 150 | 13.0 | 12.5 | 2.5 |
| 27* | 1200 | 10100 | 0.5 | −73 | −75 | 75 | 13.1 | 12.7 | 6.0 |
| 28* | 1200 | | | unmeasurable | | | | | |
| 29* | 1250 | 12300 | 1.1 | −74 | −74 | 74 | 12.2 | 8.2 | 2.0 |
| 30* | 1350 | 15000 | 2.6 | −73 | −76 | 76 | 12.4 | 12.2 | 3.0 |
| 31 | 1200 | 11900 | 1.3 | −75 | −70 | 70 | 13.0 | 12.4 | 2.0 |
| 32 | 1100 | 13900 | 0.5 | −73 | −72 | 73 | 12.9 | 12.3 | 1.5 |
| 33 | 1150 | 15000 | 0.8 | −76 | −71 | 76 | 13.3 | 13.0 | 1.0 |
| 34 | 1120 | 11700 | 0.5 | −71 | −73 | 73 | 13.1 | 12.9 | 1.5 |
| 35 | 1250 | 12100 | 0.5 | −74 | −75 | 75 | 12.9 | 12.4 | 2.0 |
| 36 | 1200 | 13400 | 0.6 | −76 | −76 | 76 | 13.2 | 13.1 | 2.0 |
| 37 | 1120 | 15900 | 0.8 | −75 | −77 | 77 | 13.1 | 12.7 | 3.0 |
| 38 | 1150 | 15400 | 0.6 | −76 | −74 | 76 | 13.2 | 12.9 | 2.0 |
| 39 | 1200 | 11500 | 0.7 | −72 | −71 | 72 | 13.1 | 13.0 | 2.0 |
| 40* | 1300 | 7800 | 0.3 | −62 | −81 | 81 | 13.0 | 12.7 | 3.0 |
| 41* | 1300 | 4900 | 0.3 | −53 | −72 | 72 | 13.2 | 12.2 | 2.0 |
| 42* | 1300 | 4100 | 1.4 | −35 | −43 | 43 | 13.1 | 12.8 | 2.0 |
| 43* | 1200 | | | unmeasurable | | | | | 1.5 |
| 44* | | | | not sintered | | | | | |
| 45* | 1150 | 13500 | 2.5 | −73 | −75 | | 11.5 | 7.8 | 2.0 |
| 46* | 1050 | 5800 | 1.3 | −68 | −62 | 68 | 12.8 | 12.3 | 5.5 |

The non-reducible dielectric ceramic composition of the system $\{(Ba_{1-x-y-z}Sr_xCa_yMg_z)O\}_m(Ti_{1-o-p}Zr_oNb_p)O_{2+p/2}$+additive (A)+additive (B: $BaO\text{-}SrO\text{-}Li_2O\text{-}SiO_2$) has been limited to those having values of x, y, m, o and p within the above respective ranges for the following reasons:

If the molar fraction of strontium, x, is less than 0.05 like as specimen No. 24, the dielectric constant becomes less than 11000, the dielectric loss tangent exceeds 2.0%, and the temperature coefficient of capacitance becomes large. If the molar fraction of Sr, x, exceeds 0.35 like as specimen No. 40, the sintering properties of the ceramics becomes lowered and the dielectric constant becomes less than 11000. In addition, the temperature coefficient of capacitance becomes too large to meet the standard of class F defined in JIS. For these reasons, the molar fraction of strontium has been limited to a value of not less than 0.05 but not more than 0.35.

If the molar fraction of calcium, y, is less than 0.005 like as specimen No. 25, the sintering properties become worse, the dielectric loss tangent becomes more than 2.0%, and the insulating resistance becomes lowered. If the molar fraction of calcium, y, exceeds 0.12, like as specimen No. 41, the sintering properties become worse and the dielectric constant becomes lowered. For these reasons, the molar fraction of calcium has been limited to a value of not less than 0.005 but not more than 0.12.

If the molar fraction of zirconium, o, is 0, like as specimen No. 26, the dielectric constant becomes less than 11000 and the temperature coefficient of capacitance becomes large. On the other hand, if o exceeds 0.20, like as specimen No. 42, the sintering properties become lowered and the dielectric constant is lowered to less than 11000. For these reasons, the molar fraction of zirconium has been limited to a value of more than 0 but not more than 0.20.

If the molar fraction of niobium, p, is less than 0.0005, like as specimen No. 27, the dielectric constant becomes less than 11000 and the crystal grain size exceeds 3 μm. On the other hand, if p exceeds 0.01, like as specimen No. 43, the ceramic composition is reduced to a semiconductor when fired in a reducing atmosphere, resulting in considerable lowering of the insulating resistance. Thus, the molar fraction of niobium has been limited to a value of not less than 0.0005 but not more than 0.010.

If the molar ratio of $(Ba_{1-x-y-z}Sr_xCa_yMg_z)O$ to $(Ti_{1-o-p}Zr_oNb_p)O_{2+p/2}$, i.e., m, is less than 1.002, like as specimen No. 28, the ceramic composition is reduced to a semiconductor when fired in a reducing atmosphere. In contrast therewith, if m exceeds 1.04, the sintering properties becomes considerably lowered. Thus, the molar ratio of the barium site to titanium site has been limited to a value of not less than 1.002 but not more than 1.04.

Further, if the added amount of additive (A), i.e., $MnO_2$, $Fe_2O_3$, $Cr_2O_3$, CoO and NiO is less than 0.02 moles per 100 mole of the basic composition, like as specimen No. 29, the insulating resistance at a temperature of more than 85° C. becomes lowered, resulting in lowering of the reliability in a long use at a high temperature. If the added amount of additive (A) exceeds 2.0 moles per 100 mole of the basic composition like as specimen No. 44, the dielectric loss tangent exceeds 2.0% and the insulating resistance becomes lowered.

If the added amount of additive (B), i.e., BaO-SrO-$Li_2O$-$SiO_2$, is less than 0.05 parts by weight per 100 parts by weight of the basic composition, like as specimen No. 30, the sintering property becomes lowered and the dielectric loss tangent exceeds 2.0%. If the added amount of additive (B) exceeds 5.0 parts by weight per 100 parts by weight of the basic composition like as specimen No. 45, the dielectric constant is decreased to less than 11000 and the crystal grain size becomes more than 3 μm. Thus, the added amount of additive (B) has been limited to those ranging from 0.05 to 5.0 parts by weight per 100 parts by weight of the basic composition.

EXAMPLE 3

Using powders of $BaCO_3$, $SrCO_3$, $CaCO_3$, $MgCO_3$, $TiO_2$, $ZrO_2$, $Nb_2O_5$, $MnO_2$, $Fe_2O_3$, $Cr_2O_3$, CoO and NiO with a purity of more than 99.8% as raw materials, there were prepared specimens in the following manner: The raw materials $BaCO_3$, $SrCO_3$, $CaCO_3$, $MgCO_3$, $TiO_2$, $ZrO_2$ and $Nb_2O_5$ were weighed and mixed to prepare a mixture for a basic composition expressed by the general formula:

$$\{(Ba_{1-x-y-z}Sr_xCa_yMg_z)O\}_m(Ti_{1-o-p}Zr_oNb_p)O_{2+p/2}$$

with values of x, y, z, o, p and m as shown in Table 5. The resultant mixture was added with one or more additives ($MnO_2$, $Fe_2O_3$, $Cr_2O_3$, CoO and NiO) in the ratios shown in Table 5, milled by the wet process for 16 hours with a ball mill, dried by evaporation, calcined in air at 1100° C. for 2 hours, crushed and then ground to obtain calcined powder with a particle size of not more than 1 μm.

Separate from the above, there was prepared a glass composition of a BaO-SrO-$Li_2O$-$SiO_2$ system consisting of, by weight, 10% of BaO, 5% of SrO, 5 % of $Li_2O$, 30% of $SiO_2$, 10% of CaO, 5% of MgO and 35% of $B_2O_3$ in the following manner. The raw materials, $BaCO_3$, $SrCO_3$, $Li_2CO_3$, $SiO_2$, $CaCO_3$, MgO and $B_2O_3$ were weighed, mixed and milled by the wet process with a ball mill for 16 hours and then dried by evaporation. The resultant mixture was put into an aluminum crucible, maintained at 1300° C. for hour, vitrified by rapid cooling, and then ground to pass a 200 mesh sieve.

The thus prepared glass composition was added to the above calcined powder together with a suitable amount of pure water and polyvinyl acetate binder. The resultant mixture was wet-milled with a ball mill for 16 hours, dried and then pressed at 2000 Kg/cm² to form green discs with a diameter of 10 mm and a thickness of 0.5 mm.

The green discs were treated in the same manner as Example 1 to prepare specimens for electron-microscope observation and measurement of electrical properties. The electrical properties, dielectric constant (ε), dielectric loss tangent (tan δ), insulating resistance (ρ), and a temperature coefficient (TC) of capacitance were measured in the same manner as Example 1. Results are shown in Table 6.

In the tables, specimens with an asterisk are compositions beyond the scope of the present invention.

TABLE 5

| | Basic composition $\{(Ba_{1-x-y}Sr_xCa_y)O\}_m(Ti_{1-o-p}Zr_oNb_p)O_{2+p/2}$ | | | | | Additive (A) (mole) | | | | | Additive (B) glass (parts by |
|---|---|---|---|---|---|---|---|---|---|---|---|
| No. | x | y | m | o | p | $MnO_2$ | $Fe_2O_3$ | $Cr_2O_3$ | CoO | NiO | weight |
| 47* | 0.03 | 0.08 | 0.01 | 1.010 | 0.12 | 0.01 | 0.5 | — | — | — | — | 0.3 |
| 48* | 0.15 | 0.002 | 0.01 | 1.010 | 0.10 | 0.01 | 0.5 | — | — | — | — | 0.3 |
| 49* | 0.18 | 0.05 | 0 | 1.010 | 0.10 | 0.015 | 0.5 | — | — | — | — | 0.3 |
| 50* | 0.18 | 0.05 | 0.01 | 1.010 | 0 | 0.015 | 0.5 | — | — | — | — | 0.3 |
| 51* | 0.15 | 0.08 | 0.01 | 1.010 | 0.12 | 0 | 0.5 | — | — | — | — | 0.3 |
| 52* | 0.20 | 0.05 | 0.005 | 0.990 | 0.10 | 0.01 | 0.5 | — | — | — | — | 0.3 |
| 53* | 0.20 | 0.05 | 0.005 | 1.005 | 0.10 | 0.01 | — | — | — | — | — | 0.3 |
| 54* | 0.20 | 0.05 | 0.005 | 1.005 | 0.10 | 0.01 | 0.5 | — | — | — | — | 0.3 |
| 55 | 0.05 | 0.12 | 0.05 | 1.010 | 0.14 | 0.02 | 1.0 | 0.2 | — | 0.4 | 0.4 | 0.05 |
| 56 | 0.20 | 0.05 | 0.01 | 1.000 | 0.12 | 0.005 | 0.5 | — | — | — | — | 1.0 |
| 57 | 0.20 | 0.05 | 0.005 | 1.010 | 0.12 | 0.005 | 0.2 | — | — | — | 0.1 | 0.5 |
| 58 | 0.35 | 0.01 | 0.0005 | 1.010 | 0.08 | 0.0005 | 0.02 | — | — | — | — | 1.0 |
| 59 | 0.20 | 0.005 | 0.02 | 1.040 | 0.10 | 0.015 | 0.2 | — | — | 0.1 | 0.1 | 5.0 |
| 60 | 0.15 | 0.08 | 0.01 | 1.015 | 0.08 | 0.01 | 0.4 | — | 0.1 | — | — | 0.3 |
| 61 | 0.25 | 0.08 | 0.01 | 1.010 | 0.01 | 0.01 | 0.2 | — | — | — | 0.1 | 0.7 |
| 62 | 0.20 | 0.05 | 0.005 | 1.010 | 0.10 | 0.01 | 0.25 | — | — | — | — | 0.5 |
| 63 | 0.15 | 0.05 | 0.004 | 1.010 | 0.20 | 0.003 | 0.5 | — | — | — | — | 0.5 |
| 64* | 0.40 | 0.05 | 0.005 | 1.010 | 0.10 | 0.01 | 0.5 | — | — | — | — | 0.3 |

TABLE 5-continued

| No. | Basic composition {(Ba$_{1-x-y}$Sr$_x$Ca$_y$)O}$_m$(Ti$_{1-o-p}$Zr$_o$Nb$_p$)O$_{2+p/2}$ | | | | | | Additive (A) (mole) | | | | | Additive (B) glass (parts by weight) |
|---|---|---|---|---|---|---|---|---|---|---|---|---|
| | x | y | m | o | | p | MnO$_2$ | Fe$_2$O$_3$ | Cr$_2$O$_3$ | CoO | NiO | |
| 65* | 0.15 | 0.15 | 0.01 | 1.010 | 0.13 | 0.01 | 0.5 | — | — | — | — | 0.3 |
| 66* | 0.20 | 0.05 | 0.08 | 1.010 | 0.10 | 0.01 | 0.5 | — | — | — | — | 0.3 |
| 67* | 0.20 | 0.05 | 0.01 | 1.010 | 0.25 | 0.01 | 0.5 | — | — | — | — | 0.3 |
| 68* | 0.15 | 0.08 | 0.01 | 1.010 | 0.12 | 0.03 | 0.5 | — | — | — | — | 0.3 |
| 69* | 0.20 | 0.05 | 0.005 | 1.050 | 0.10 | 0.01 | 0.5 | — | — | — | — | 1.0 |
| 70* | 0.20 | 0.05 | 0.005 | 1.005 | 0.10 | 0.01 | 3.0 | — | — | — | — | 0.5 |
| 71* | 0.20 | 0.05 | 0.005 | 1.005 | 0.10 | 0.01 | 0.5 | — | — | — | — | 10.0 |

TABLE 6

| No. | Sintering temp. (°C.) | ε | tan δ | TC of capacitance ΔC/C$_{20}$ × 100/ΔT (%) | | | Volume resistivity log ρ (Ω·cm) | | Grain size (μm) |
|---|---|---|---|---|---|---|---|---|---|
| | | | | −25° C. | 85° C. | \|Max\| | 25° C. | 85° C. | |
| 47* | 1250 | 6700 | 2.4 | −47 | −3 | 95 | 13.0 | 12.4 | 2.0 |
| 48* | 1300 | 11500 | 3.0 | −71 | −32 | 71 | 11.0 | 8.5 | 3.0 |
| 49* | 1200 | 13000 | 1.4 | −76 | −71 | 76 | 11.9 | 8.9 | 2.0 |
| 50* | 1250 | 7000 | 1.6 | −73 | −4 | 150 | 13.0 | 12.5 | 2.0 |
| 51* | 1200 | 9900 | 0.7 | −72 | −73 | 73 | 13.1 | 12.6 | 6.0 |
| 52* | 1200 | | | | unmeasurable | | | | 2.5 |
| 53* | 1250 | 12600 | 1.0 | −72 | −75 | 75 | 12.1 | 8.2 | 2.0 |
| 54* | 1350 | 15100 | 2.7 | −71 | −74 | 74 | 12.5 | 12.4 | 3.0 |
| 55 | 1200 | 12500 | 1.5 | −75 | −72 | 75 | 12.9 | 12.0 | 2.0 |
| 56 | 1100 | 14600 | 0.7 | −75 | −73 | 75 | 13.1 | 12.7 | 1.5 |
| 57 | 1150 | 15200 | 0.6 | −76 | −71 | 76 | 13.0 | 12.9 | 2.0 |
| 58 | 1120 | 11600 | 0.5 | −73 | −71 | 73 | 13.2 | 13.0 | 1.5 |
| 59 | 1250 | 12700 | 0.6 | −75 | −73 | 75 | 12.9 | 12.2 | 2.0 |
| 60 | 1200 | 13900 | 0.7 | −76 | −73 | 76 | 13.2 | 13.0 | 2.0 |
| 61 | 1120 | 17000 | 0.8 | −77 | −77 | 77 | 13.1 | 13.0 | 3.0 |
| 62 | 1150 | 15500 | 0.6 | −76 | −74 | 76 | 13.2 | 13.0 | 1.5 |
| 63 | 1200 | 11300 | 0.8 | −72 | −70 | 72 | 13.1 | 12.9 | 2.0 |
| 64* | 1300 | 7200 | 0.4 | −60 | −81 | 81 | 13.0 | 12.7 | 3.0 |
| 65* | 1300 | 5500 | 0.3 | −54 | −69 | 69 | 13.1 | 12.0 | 2.5 |
| 66* | 1180 | 6000 | 1.9 | −48 | −63 | 63 | 11.2 | 8.0 | 4.0 |
| 67* | 1300 | 4400 | 1.2 | −38 | −45 | 45 | 13.0 | 12.8 | 2.0 |
| 68* | 1200 | | | | unmeasurable | | | | 1.5 |
| 69* | | | | | not sintered | | | | |
| 70* | 1150 | 13700 | 2.3 | −74 | −72 | 74 | 11.5 | 7.9 | 2.0 |
| 71* | 1050 | 5800 | 1.0 | −67 | −60 | 67 | 12.9 | 12.3 | 5.0 |

As can be seen from the results shown in Table 6, the non-reducible dielectric ceramic composition of the present invention possesses a high dielectric constant of not less than 11000 and a low dielectric loss tangent of not more than 2.0%, and meets requirements of class F defined by JIS as a temperature coefficient of capacitance is in the range of −80% to +20% over the temperatures range of −25° C. to +85° C.

The composition of the present invention has a high insulating resistance as the logalithimic value of volume resistance is not less than 12. Also, it can be sintered at a relatively low temperature of not more than 1250° C., and has a small grain size of not more than 3 μm.

The non-reducible dielectric ceramic composition of the system {(Ba$_{1-x-y-z}$Sr$_x$Ca$_y$Mg$_z$)O}$_m$(Ti$_{1-o-p}$Zr$_o$Nb$_p$)O$_{2+p/2}$+Additive (A)+Additive (B: BaO-SrO-Li$_2$O-SiO$_2$), has been limited to those having the molar fractions of respective components within the above respective ranges for the following reasons:

If the molar fraction of strontium, x, is less than 0.05 like as specimen No. 47, the dielectric constant becomes less than 11000, the dielectric loss tangent exceeds 2.0%, and the temperature coefficient of capacitance becomes large. If the molar fraction of Sr, x, exceeds 0.35 like as specimen No. 64, the sintering properties of the ceramics becomes lowered and the dielectric constant becomes less than 11000. In addition, the temperature coefficient of capacitance becomes too large to meet the standard of class F defined in JIS. Thus, the molar fraction of strontium has been limited to not less than 0.05 but not more than 0.35.

If the molar fraction of calcium, y, is less than 0.005 like as specimen No. 48, the sintering properties become worse. In addition, the dielectric loss tangent exceeds 2.0% and the insulating resistance becomes lowered. If the molar fraction of calcium, y, exceeds 0.12, like as specimen No. 65, the sintering properties become worse and the dielectric constant becomes lowered. Thus, the molar fraction of calcium has been limited to not less than 0.005 but not more than 0.12.

If the molar fraction of magnesium, z, is less than 0.0005, like as specimen No. 49, the insulating resistance at 25° C. and 85° C. becomes lowered. If z exceeds 0.05, like as specimen No. 66, the dielectric constant is lowered to less than 11000 and the sintering properties become lowered. Also, the grain size becomes more than 3 μm. For these reasons, the molar fraction of magnesium has been limited to not less than 0.0005 but not more than 0.05.

If the molar fraction of zirconium, o, is 0, like as specimen No. 54, the dielectric constant becomes less than 11000 and the temperature coefficient of capacitance becomes large. On the other hand, if o exceeds 0.20, like as specimen No. 67, the sintering property is lowered and the dielectric constant is decreased to less than 11000. For these reasons, the molar fraction of zirconium has been limited to a value of more than 0 but not more than 0.20.

If the molar fraction of niobium, p, is less than 0.0005, like as specimen No. 51, the dielectric constant becomes less than 11000 and the crystal grain size becomes more than 3 μm. On the other hand, if p exceeds 0.02, like as specimen No. 68, the ceramic composition is reduced to a semiconductor when fired in a reducing atmosphere, resulting in considerable lowering of the insulating resistance. Thus, the molar fraction of niobium has been limited to 0.0005 to 0.02.

If the molar ratio of $(Ba_{1-x-y-z}Sr_xCa_yMg_z)O$ to $(Ti_{1-o-p}Zr_oNb_p)O_{2+p/2}$, i.e., m, is less than the stoichiometric value, i.e., 1.000, like as specimen No. 52, the ceramic composition is reduced to a semiconductor when fired in a reducing atmosphere. If m exceeds 1.04, the sintering properties becomes considerably lowered. Thus, the molar ratio of the barium site to the titanium site has been limited to a value of not less than 1.000 but not more than 1.04.

Further, if the added amount of the additive (A: $MnO_2$, $Fe_2O_3$, $Cr_2O_3$, CoO, NiO) is less than 0.02 moles per 100 moles of the basic composition, like as specimen No. 53, the insulating resistance at a temperature of more than 85° C. becomes lowered, resulting in lowering of the reliability at a high temperature. If the added amount of the additive (A) exceeds 2.0 moles, like as specimen No. 70, the dielectric loss tangent exceeds 2.0% and the insulating resistance becomes lowered. Thus, the added amount of additive (A) has been limited to 0.02 to 2.0 moles per 100 moles of the basic composition.

If the additive (B) is less than 0.05 parts by weight per 100 parts by weight of the basic composition, like as specimen No. 54, the sintering property becomes lowered and the dielectric loss tangent exceeds 2.0%. If the added amount of the glass composition exceeds 5.0 parts by weight per 100 parts by weight of the basic composition like as specimen No 71, the dielectric constant is decreased to less than 11000 and the crystal grain size becomes more than 3 μm. Thus, the added amount of the additive (B) has been limited to 0.05 to 5.0 parts by weight per 100 parts by weight of the basic composition.

EXAMPLE 4

Using powders of $BaCO_3$, $SrCO_3$, $CaCO_3$, $MgCO_3$, $TiO_2$, $ZrO_2$, $Nb_2O_5$, $MnO_2$, $Fe_2O_3$, $Cr_2O_3$, CoO, NiO, $SiO_2$ and ZnO with the purity of more than 99.8% as raw materials, there were prepared calcined powders in the following manner: The raw materials $BaCO_3$, $SrCO_3$, $CaCO_3$, $MgCO_3$, $TiO_2$, $ZrO_2$ and $Nb_2O_5$ were weighed and mixed to prepare a mixture for a basic composition expressed by the general formula:

$$\{(Ba_{1-x-y-z}Sr_xCa_yMg_z)O\}_m(Ti_{1-o-p}Zr_oNb_p)O_{2+p/2}$$

with values of x, y, z, o, p and m as shown in Table 7.

The additive (A), $MnO_2$, $Fe_2O_3$, $Cr_2O_3$, CoO and NiO, and the additive (B), $SiO_2$, ZnO, were added to the mixture for the basic composition in the ratios shown in Table 7. Using each resultant mixture of raw materials, there was prepared calcined powder with a particle size of not more than 1 μm, in the same manner as Example 1.

The calcined powder was treated in the same manner as Example to prepare specimens for electron-microscope observation and measurement of electrical properties. The specimens were subjected to measurement of electrical properties, i.e., dielectric constant (ε), dielectric loss tangent (tan δ), insulating resistance (ρ) and a temperature coefficient (TC) of capacitance. The measurements were carried out in the same manner as Example 1. Results are shown in Table 8.

TABLE 7

| No. | Basic composition $\{(Ba_{1-x-y-z}Sr_xCa_yMg_z)O\}_m(Ti_{1-o-p}Zr_oNb_p)O_{2+p/2}$ | | | | | | Additive A (mole) | | | | | Additive B (mole) | |
|---|---|---|---|---|---|---|---|---|---|---|---|---|---|
| | x | y | z | m | o | p | $MnO_2$ | $Fe_2O_3$ | $Cr_2O_3$ | CoO | NiO | $SiO_2$ | ZnO |
| 72* | 0.03 | 0.08 | 0.01 | 1.010 | 0.12 | 0.01 | 0.5 | — | — | — | — | 0.5 | 0.2 |
| 73* | 0.15 | 0.002 | 0.01 | 1.010 | 0.10 | 0.01 | 0.5 | — | — | — | — | 0.5 | 0.2 |
| 74* | 0.18 | 0.05 | 0 | 1.010 | 0.10 | 0.015 | 0.5 | — | — | — | — | 0.5 | 0.2 |
| 75* | 0.18 | 0.05 | 0.01 | 1.010 | 0 | 0.015 | 0.5 | — | — | — | — | 0.5 | 0.2 |
| 76* | 0.15 | 0.08 | 0.01 | 1.010 | 0.12 | 0 | 0.5 | — | — | — | — | 0.5 | 0.2 |
| 77* | 0.20 | 0.05 | 0.005 | 0.990 | 0.10 | 0.01 | 0.5 | — | — | — | — | 0.5 | 0.2 |
| 78* | 0.20 | 0.05 | 0.005 | 1.005 | 0.10 | 0.01 | — | — | — | — | — | 0.5 | 0.2 |
| 79* | 0.20 | 0.05 | 0.005 | 1.005 | 0.10 | 0.01 | 0.5 | — | — | — | — | — | — |
| 80 | 0.05 | 0.10 | 0.05 | 1.010 | 0.15 | 0.02 | 1.0 | 0.3 | 0.1 | 0.4 | 0.2 | 0.1 | — |
| 81 | 0.20 | 0.05 | 0.01 | 1.000 | 0.12 | 0.005 | 0.5 | — | — | — | — | 0.3 | 0.2 |
| 82 | 0.20 | 0.05 | 0.005 | 1.010 | 0.12 | 0.005 | 0.2 | 0.1 | — | — | 0.1 | 0.3 | 0.2 |
| 83 | 0.30 | 0.01 | 0.0005 | 1.005 | 0.10 | 0.0005 | 0.02 | — | — | — | — | 0.7 | 0.5 |
| 84 | 0.20 | 0.005 | 0.02 | 1.030 | 0.10 | 0.015 | 0.4 | — | — | 0.1 | — | 1.0 | 1.0 |
| 85 | 0.15 | 0.08 | 0.01 | 1.015 | 0.08 | 0.01 | 0.4 | — | — | — | 0.1 | 1.0 | — |
| 86 | 0.25 | 0.08 | 0.01 | 1.010 | 0.01 | 0.01 | 0.5 | — | 0.1 | — | — | 0.5 | 0.5 |
| 87 | 0.20 | 0.05 | 0.005 | 1.010 | 0.10 | 0.01 | 0.25 | — | — | — | — | 0.5 | 0.5 |
| 88 | 0.15 | 0.05 | 0.004 | 1.010 | 0.20 | 1.003 | 0.5 | — | — | — | — | 0.7 | 0.5 |
| 89* | 0.35 | 0.08 | 0.005 | 1.015 | 0.10 | 1.01 | 0.5 | — | — | — | — | 0.5 | 0.2 |
| 90* | 0.15 | 0.15 | 0.01 | 1.010 | 0.12 | 0.01 | 0.5 | — | — | — | — | 0.5 | 0.2 |
| 91* | 0.20 | 0.05 | 0.08 | 1.010 | 0.10 | 0.01 | 0.5 | — | — | — | — | 0.5 | 0.2 |
| 92* | 0.20 | 0.05 | 0.01 | 1.010 | 0.25 | 0.01 | 0.5 | — | — | — | — | 0.5 | 0.2 |
| 93* | 0.15 | 0.08 | 0.01 | 1.010 | 0.12 | 0.03 | 0.5 | — | — | — | — | 0.5 | 0.2 |
| 94* | 0.20 | 0.05 | 0.005 | 1.040 | 0.10 | 0.01 | 0.5 | — | — | — | — | 0.5 | 0.2 |
| 95* | 0.20 | 0.05 | 0.005 | 1.005 | 0.10 | 0.01 | 3.0 | — | — | — | — | 0.5 | 0.2 |
| 96* | 0.20 | 0.05 | 0.005 | 1.005 | 0.10 | 0.01 | 0.5 | — | — | — | — | 2.0 | 2.0 |

TABLE 8

| No. | Sintering temp. (°C.) | $\epsilon$ | tan δ | TC of capacitance $\Delta C/C_{20} \times 100/\Delta T$ (%) −25° C. | 85° C. | \|Max\| | Volume resistivity log ρ (Ω·cm) 25° C. | 85° C. | Grain size (μm) |
|---|---|---|---|---|---|---|---|---|---|
| 72* | 1300 | 7100 | 2.2 | −50 | −1 | 100 | 13.0 | 12.5 | 2.0 |
| 73* | 1350 | 12000 | 3.1 | −67 | −30 | 67 | 10.9 | 8.7 | 3.0 |
| 74* | 1270 | 14500 | 1.3 | −75 | −72 | 75 | 11.8 | 9.0 | 1.5 |
| 75* | 1300 | 6500 | 1.8 | −70 | −6 | 200 | 12.8 | 12.5 | 2.0 |
| 76* | 1270 | 11000 | 0.9 | −70 | −75 | 75 | 13.2 | 12.8 | 7.0 |
| 77* | 1270 | | | unmeasurable | | | | | 3.0 |
| 78* | 1300 | 13200 | 1.0 | −73 | −76 | 76 | 12.0 | 8.3 | 2.0 |
| 79* | 1350 | 15100 | 2.7 | −71 | −74 | 74 | 12.5 | 12.4 | 3.0 |
| 80 | 1250 | 13500 | 1.7 | −75 | −73 | 75 | 12.8 | 12.0 | 2.0 |
| 81 | 1270 | 15300 | 0.6 | −76 | −72 | 76 | 13.0 | 12.6 | 2.0 |
| 82 | 1270 | 16100 | 0.7 | −77 | −73 | 77 | 13.2 | 13.0 | 1.0 |
| 83 | 1300 | 12500 | 0.5 | −75 | −70 | 75 | 13.1 | 13.0 | 1.5 |
| 84 | 1270 | 18000 | 0.8 | −77 | −76 | 77 | 12.8 | 12.0 | 3.0 |
| 85 | 1250 | 15500 | 0.7 | −76 | −74 | 76 | 13.2 | 13.0 | 2.0 |
| 86 | 1250 | 18700 | 0.7 | −78 | −77 | 78 | 13.1 | 12.9 | 3.0 |
| 87 | 1230 | 16400 | 0.6 | −76 | −75 | 76 | 13.3 | 13.1 | 1.5 |
| 88 | 1270 | 12100 | 0.9 | −73 | −69 | 73 | 13.1 | 13.0 | 3.0 |
| 89* | 1350 | 8000 | 0.3 | −62 | −84 | 84 | 13.0 | 12.5 | 3.0 |
| 90* | 1350 | 5900 | 0.2 | −59 | −71 | 71 | 13.0 | 12.0 | 1.5 |
| 91* | 1250 | 6600 | 1.8 | −45 | −57 | 57 | 11.1 | 7.9 | 5.0 |
| 92* | 1350 | 4800 | 1.3 | −31 | −47 | 47 | 13.1 | 12.8 | 3.0 |
| 93* | 1250 | | | unmeasurable | | | | | 2.0 |
| 94* | | | | not sintered | | | | | |
| 95* | 1250 | 15000 | 2.5 | −75 | −72 | 75 | 11.3 | 8.8 | 3.0 |
| 96* | 1250 | 9900 | 1.2 | −73 | −72 | 73 | 11.0 | 8.2 | 6.0 |

As will be understood from the results shown in Table 8, the non-reducible dielectric ceramic composition of the present invention has low sintering temperature of not more than 1250° C., possesses low dielectric loss and improved temperature coefficient of capacitance.

In the system $\{(Ba_{1-x-y-z}Sr_xCa_yMg_z)O\}_m(Ti_{1-o-p}Zr_oNb_p)O_{2+p/2}$+Additive (A: $MnO_2$, $Fe_2O_3$, $Cr_2O_3$, CoO, NiO,)+Additive (B: $SiO_2$, ZnO), the non-reducible dielectric ceramic composition has been limited to those having molar fractions of respective components and added amounts of the additives (A) and (B) within the above respective ranges for the following reasons:

If the molar fraction of strontium, x, is less than 0.05 like as specimen No. 72, the dielectric constant becomes less than 12000, the dielectric loss tangent exceeds 2.0%, and the temperature coefficient of capacitance becomes large. If the molar fraction of strontium exceeds 0.30, like as specimen No. 89, the sintering property becomes lowered and the dielectric constant becomes less than 12000. In addition, the temperature coefficient of capacitance becomes too large to meet the standard of class F defined in JIS. Thus, the molar fraction of strontium has been limited to not less than 0.05 but not more than 0.30.

If the molar fraction of calcium, y, is less than 0.005 like as specimen No. 73, the sintering properties become worse. In addition, the dielectric loss tangent exceeds 2.0% and the insulating resistance becomes lowered. If the molar fraction of calcium, y, exceeds 0.10, like as specimen No. 90, the sintering property becomes worse and the dielectric constant becomes lowered. Thus, the molar fraction of calcium has been limited to not less than 0.005 but not more than 0.10.

If the molar fraction of magnesium, z, is less than 0.0005, like as specimen No. 74, the insulating resistance at 25° C. and 85° C. becomes lowered. If z exceeds 0.05, like as specimen No. 91, the dielectric constant is lowered to less than 12000 and the sintering property becomes lowered. Also, the grain size becomes more than 3 μm. For these reasons, the molar fraction of magnesium has been limited to not less than 0.0005 but not more than 0.05.

If the molar fraction of zirconium, o, is 0, like as specimen No. 75, the dielectric constant becomes less than 12000 and the temperature coefficient of capacitance becomes large. On the other hand, if o exceeds 0.20, like as specimen No. 92, the sintering property is lowered and the dielectric constant is decreased to less than 12000. For these reasons, the molar fraction of zirconium has been limited to a value of more than 0 but not more than 0.20.

If the molar fraction of niobium, p, is less than 0.0005, like as specimen No. 76, the dielectric constant becomes less than 12000 and the crystal grain size becomes more than 3 μm. On the other hand, if p exceeds 0.02, like as specimen No. 93, the ceramic composition is reduced to a semiconductor when fired in a reducing atmosphere, resulting in considerable lowering of the insulating resistance. Thus, the molar fraction of niobium has been limited to 0.0005 to 0.02.

If the molar ratio of $(Ba_{1-x-y-z}Sr_xCa_yMg_z)O$ to $(Ti_{1-o-p}Zr_oNb_p)O_{2+p/2}$, i.e., m, is less than the stoichiometric value, i.e., 1.000, like as specimen No. 77, the ceramic composition is reduced to a semiconductor when fired in a reducing atmosphere. If m exceeds 1.03, the sintering properties becomes considerably lowered. Thus, the molar ratio of the barium site to the titanium site has been limited to a value of not less than 1.000 but not more than 1.03.

Further, if the added amount of the additive (A: $MnO_2$, $Fe_2O_3$, $Cr_2O_3$, CoO, NiO) is less than 0.02 moles per 100 moles of the basic composition, like as specimen No. 78, the insulating resistance at a temperature of more than 85° C. becomes lowered, resulting in lowering of the reliability at a high temperature. If the added amount of the additive (A) exceeds 2.0 moles, like as specimen No. 95, the dielectric loss tangent exceeds 2.0% and the insulating resistance becomes lowered. Thus, the added amount of additive (A) has been limited to 0.02 to 2.0 moles per 100 moles of the basic composition.

If the additive (B) is less than 0.05 moles per 100 moles of the basic composition, like as specimen No. 79, the sintering property becomes lowered and the dielectric loss tangent exceeds 2.0%. If the added amount of the glass composition exceeds 5.0 moles per 100 moles of the basic composition like as specimen No. 96, the dielectric constant is decreased to less than 12000 and the crystal grain size becomes more than 3 μm. Thus, the added amount of the additive (B) has been limited to 0.05 to 5.0 moles per 100 moles of the basic composition.

What is claimed is:

1. A non-reducible dielectric ceramic composition consisting essentially of a basic composition of a modified barium titanate system and additives (A) and (B) incorporated therein, said basic composition consisting essentially of oxides of Ba, Sr, Ca, Ti, Zr and Nb and having a composition expressed by the general formula:

$$\{(Ba_{1-x-y}Sr_xCa_y)O\}_m(Ti_{1-o-p}Zr_oNb_p)O_{2+p/2}$$

wherein $0.05 \leq x \leq 0.30$, $0.005 \leq y \leq 0.12$, $0 < o \leq 0.20$, $0.0005 \leq p \leq 0.012$, and $1.002 \leq m \leq 1.03$, said additive (A) being composed of at least one oxide selected from the group consisting of oxides of Mn, Fe, Cr, Co and Ni, said additive (A) being incorporated into said basic composition in an amount of 0.02 to 2.0 moles per 100 moles of said basic composition in terms of respective oxides, $MnO_2$, $Fe_2O_3$, $Cr_2O_3$, CoO and NiO, said additive (B) consisting of $SiO_2$ and/or ZnO and incorporated into said basic composition in an amount of 0.1 to 2.0 moles per 100 moles of said basic composition.

2. A non-reducible dielectric ceramic composition according to claim 1 wherein barium in the basic composition is partially replaced with the equimolar amount of magnesium to have a basic composition expressed by the general formula:

$$\{(Ba_{1-x-y-z}Sr_xCa_yMg_z)O\}_m(Ti_{1-o-p}Zr_oNb_p)O_{2+p/2}$$

wherein $0.05 \leq x \leq 0.30$, $0.005 \leq y \leq 0.10$, $0.0005 \leq z \leq 0.05$, $0 < o \leq 0.20$, $0.0005 \leq p \leq 0.02$, $1.000 \leq m \leq 1.04$.

3. A non-reducible dielectric ceramic composition consisting essentially of a basic composition of a modified barium titanate system and additives (A) and (B) incorporated therein, said basic composition consisting essentially of oxides of Ba, Sr, Ca, Ti, Zr and Nb and having a composition expressed by the general formula:

$$\{(Ba_{1-x-y}Sr_xCa_y)O\}_m(Ti_{1-o-p}Zr_oNb_p)O_{2+p/2}$$

wherein $0.05 \leq x \leq 0.35$, $0.005 \leq y \leq 0.12$, $0 < o \leq 0.20$, $0.0005 \leq p \leq 0.010$, and $1.002 \leq m \leq 1.04$, said additive (A) being composed of at least one oxide selected from the group consisting of oxides of Mn, Fe, Cr, Co and Ni, the content of said additive (A) being 0.02 to 2.0 moles per 100 moles of said basic composition in terms of respective oxides, $MnO_2$, $Fe_2O_3$, $Cr_2O_3$, CoO and NiO, said additive (B) being composed of a glass composition of a $BaO$-$SrO$-$Li_2O$-$SiO_2$ system, the content of said additive (B) being 0.05 to 5.0 parts by weight per 100 parts by weight of said basic composition.

4. The non-reducible dielectric ceramic composition according to claim 3 wherein barium in the basic composition is partially replaced with the equimolar amount of magnesium to have a basic composition expressed by the general formula:

$$\{(Ba_{1-x-y-z}Sr_xCa_yMg_z)O\}_m(Ti_{1-o-p}Zr_oNb_p)O_{2+p/2}$$

wherein $0.05 \leq x \leq 0.35$, $0.005 \leq y \leq 0.12$, $0.0005 \leq z \leq 0.05$, $0 < o \leq 0.20$, $0.0005 \leq p \leq 0.02$, $1.000 \leq m \leq 1.04$.

* * * * *